Patented Oct. 24, 1950

2,526,943

UNITED STATES PATENT OFFICE 2,526,943

N,N-DIALKYL-N'-PHENYL-N'(2-HETEROCYCLYL OR HETEROCYCLYLALKYLENE) ETHYLENEDIAMINES

Paul Louis Gailliot, Paris, Georges Rouze, Villeneuve-le-Roi, and Paul Eugene Gastou, Paris, France, assignors to Societe des Usines Chimiques Rhone-Poulenc, Paris, France, a French body corporate No Drawing. Application April 3, 1946, Serial No. 659,434. In France June 22, 1943

Section 1, Public Law 690, August 8, 1946
Patent expires June 22, 1963

11 Claims. (Cl. 260—302)

This invention relates to new substituted diamines and in particular is concerned with a new class of substituted diamines which exhibit unexpected therapeutic usefulness. This invention also relates to certain novel processes for the production of these new compounds.

The new substituted diamines of the present invention are compounds of the general formula:

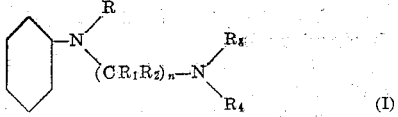

(in which R represents a radical selected from the class consisting of heterocyclic groups and heterocyclyl-alkylene groups, $R_1$ and $R_2$ represent radicals selected from the class consisting of hydrogen atoms and alkyl groups, $R_3$ and $R_4$ represent alkyl groups and $n$ is an integer not less than 2) which are of considerable therapeutic interest by reason of the anti-histaminic effect which they exert.

The new compounds of the present invention are, in general, prepared by the application of methods generally known for the preparation of di-tertiary diamines and in particular (a) by condensation of secondary amines of the type:

as their sodium derivatives with a halogenated tertiary amine of the type:

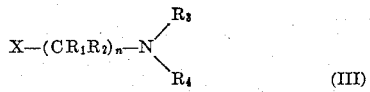

in which X represents a halogen atom, and in which $R_1$, $R_2$, $R_3$ and $R_4$ and $n$ have the same significance as in Formula I, or (b) by condensation of a substituted diamine of the type:

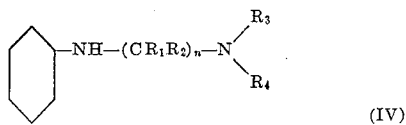

as its sodium derivative, with either a heterocyclic halide or with an alkyl halide which carries a heterocyclic substituent, or (c) by condensation between a secondary amine of the type:

and halogenated compounds of the type:

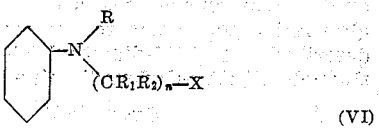

where X is a halogen atom and the remaining symbols have the significance assigned to them in Formula I.

The following non-limitative examples indicate the manner in which the invention may be put into effect:

Example I 25 g. of furfurylaniline are heated to 140° C. in an oil bath and a solution of 7.8 g. of 1-dimethylamino-2-chloroethane in 40 cc. of ether is added gradually thereto. The ether distills off. The mixture is cooled, taken up in water and extracted with ether to remove excess furfurylaniline. The aqueous layer is treated with soda, the base, N-dimethylaminoethyl-N-furfurylaniline, thereby generated is extracted with ether, converted into its dihydrochloride and purified as such by crystallisation from boiling ethyl alcohol. It forms white needles of M. P. 134° C. readily soluble in water.

Example II 80 g. of tetrahydrofurfurylaniline (prepared by condensation of tetrahydrofurfuryl bromide with aniline) are heated for 2 hours at 150° C. with 31.7 g. of 1-dimethylamino-2-chloroethane hydrochloride; the reaction mixture is then taken up in water, neutralised and extracted with ether to remove the excess tetrahydrofurfurylaniline.

The aqueous layer is lixiviated with soda in order to generate the reaction product as free base, and the latter is then extracted into ether. The ether extract is dried over $Na_2SO_4$, the ether driven off and the base distilled. It collects at 160°/4 mm. This base, N-dimethylaminoethyl-N-tetrahydrofurfurylaniline, is then converted to hydrochloride which, after crystallisation from ethyl alcohol, melts at approximately 150° C.

Example III 83 g. of N-beta(4'-methyl-5'-thiazolyl)-ethyl-aniline, prepared by the action of aniline on 4-methyl-5-beta-chloroethyl-thiazole are heated to 150° C for 2 hours with 27.5 g. of 1-dimethyl-amino-2-chloroethane hydrochloride. The product is taken up in water, the aqueous solution neutralised to pH 7 and the quantity of the 4-methyl-5-phenylaminoethyl-thiazole which has not entered into the reaction is removed by extraction into ether. The newly formed product is liberated as free base by lixiviating the aqueous mother liquor with soda. It is extracted into ether and distilled. The N-beta(4'-methyl-5'-thiazolyl)-ethyl-N-dimethylaminoethyl-aniline distils at 180–185°/5 mm. Its dihydrochloride melts at 142° C.

Example IV

A solution of 33 g. of N-dimethylaminoethyl-aniline in 33 cc. of 6N hydrochloride acid are heated to 80° C. 20 g. of alpha-chloromethyl-thiophene are added in a single addition and the mixture heated to boiling for 3 hours. The mixture is then cooled, neutral products are extracted with ether, the free base is generated in the remaining mother liquor by the addition of soda, then extracted from it into ether, and the extract is dried and thereafter distilled. N-dimethylaminoethyl - N-alpha-thienylmethyl-aniline obtained thereby distils at 182–184°/1.8 mm. and its hydrochloride melts at 174° C. approx. In alternative nomenclature, the compound may be described as N,N-dimethyl-N'-(phenyl)-N'(2-thienylmethyl)-ethylenediamine.

Example V

A mixture of 15 cc. of water, 15 cc. of hydrochloric acid (22° Bé.), 22 g. of the hydrochloride of 4-chloromethyl-thiazole and 27.7 g. of N-dimethylaminoethyl-aniline are refluxed for 2 hours. After cooling, the mixture is made alkaline with soda, extracted with ether and distilled under vacuum. N-dimethylaminoethyl-N-thiazolyl-4'-methyl)-aniline distils over at 183–5°/1 mm. as an oil. Its hydrochloride is readily soluble in water.

The 4-chloromethyl-thiazole hydrochloride required for the reaction is itself obtained from thioformamide and 1:3-dichloro-acetone according to the technique used by Johnson (J. A. C. S. 56, 470) in the case of thioacetamide.

It should be understood that the present invention is in no way limited to the foregoing examples. The research and experimentation conducted by the present applicants has made it clear that, with respect to general Formula I, R is not limited to the specific case of the furfuryl, tetrahydrofurfuryl, thiazolylmethyl, thiazolylethyl and thienyl radicals as above described but may represent any heterocyclic radical connected either directly, or through an alkylene group, to the adjacent nitrogen atom. Preferably, said heterocyclic radical is mononuclear. Similarly, the radicals $R_1$, $R_2$, $R_3$ and $R_4$ and the integer $n$ are to be construed in a generic sense in accordance with the respective definitions accorded thereto.

We claim:

1. New therapeutically useful substituted diamines of the type:

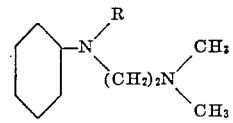

in which R is a member of the class consisting of the furfuryl, thienyl and thiazolyl heterocycles and furfuryl-, thienyl-, and thiazolyl-alkylene groups.

2. N - ($\beta$ - dialkylamino-ethyl) -N-heterocyclyl-anilines.

3. N - ($\beta$-dialkylamino-ethyl) -N-heterocyclyl-alkylene-anilines.

4. N - ($\beta$-dialkylamino-ethyl) -N-furfuryl-anilines.

5. N - ($\beta$ - dialkylamino-ethyl) -N-tetrahydrofurfuryl-anilines.

6. N-($\beta$-dialkylamino-ethyl) -N-thiazolylalkylene-anilines.

7. N-($\beta$-dimethylamino-ethyl) -N-furfurylaniline.

8. N - ($\beta$-dimethylamino-ethyl) -N-tetrahydrofurfuryl-aniline.

9. N-beta(4'-methyl-5'-thiazolyl-ethyl) -N-dimethyl-amino-ethyl-aniline.

10. N - ($\beta$-dimethylamino-ethyl) -N-thiazolyl-4'-methyl-aniline.

11. N,N - dimethyl-N'-(phenyl)-N'(2-thienylmethyl)-ethylenediamine.

PAUL LOUIS GAILLIOT.
GEORGES ROUZE.
PAUL EUGENE GASTOU.

No references cited.